US008269678B2

(12) United States Patent
Sun

(10) Patent No.: US 8,269,678 B2
(45) Date of Patent: Sep. 18, 2012

(54) TABLET PERSONAL COMPUTER AND ANTENNA MODULE THEREOF

(75) Inventor: Rong-Cheng Sun, Taipei Hsien (TW)

(73) Assignee: Wistron Corporation, Taipei Hsien (TW)

(*) Notice: Subject to any disclaimer, the term of this patent is extended or adjusted under 35 U.S.C. 154(b) by 426 days.

(21) Appl. No.: 12/588,706

(22) Filed: Oct. 26, 2009

(65) Prior Publication Data

US 2010/0171668 A1 Jul. 8, 2010

(30) Foreign Application Priority Data

Jan. 6, 2009 (TW) ............................... 98100229 A

(51) Int. Cl.
*H01Q 1/24* (2006.01)
*H04M 1/00* (2006.01)

(52) U.S. Cl. ...... 343/702; 343/872; 343/787; 455/575.1

(58) Field of Classification Search ........................ None
See application file for complete search history.

(56) References Cited

U.S. PATENT DOCUMENTS

| | | | | |
|---|---|---|---|---|
| 6,917,824 | B2 * | 7/2005 | Kobayashi | 455/575.3 |
| 7,880,678 | B2 * | 2/2011 | Degner et al. | 343/702 |
| 7,911,397 | B2 * | 3/2011 | Degner et al. | 343/702 |
| 2004/0132482 | A1 * | 7/2004 | Kang et al. | 455/550.1 |
| 2004/0203532 | A1 * | 10/2004 | Mizuta | 455/90.3 |
| 2004/0209645 | A1 * | 10/2004 | Park et al. | 455/556.1 |
| 2005/0136970 | A1 * | 6/2005 | Kim | 455/550.1 |
| 2006/0135225 | A1 * | 6/2006 | Lin et al. | 455/575.3 |
| 2007/0149260 | A1 * | 6/2007 | Satoh et al. | 455/575.1 |

* cited by examiner

*Primary Examiner* — Trinh Dinh
(74) *Attorney, Agent, or Firm* — Bacon & Thomas, PLLC

(57) ABSTRACT

An antenna module for a tablet personal computer is disclosed. The tablet personal computer comprises a main body and a housing with a screen, and the housing is pivotally connected to the main body. The tablet personal computer is capable of being switched to a tablet mode. The antenna module comprises an antenna device, a first magnetic element, and a second magnetic element. The antenna device is located concealably in the housing. The first magnetic element is coupled to an end of the antenna device. The second magnetic element is located in the main body. The second magnetic element is positioned corresponding to the first magnetic element in the tablet mode such that an end of the antenna device can be moved outside the housing due to a magnetic force between the first magnetic element and the second magnetic element.

19 Claims, 7 Drawing Sheets

TABLET PERSONAL COMPUTER AND ANTENNA MODULE THEREOF

RELATED APPLICATIONS

This application is based upon and claims the benefit of priority under 35 U.S.C. 119 from TAIWAN application serial No. 098400229 filed Jan. 6, 2009, the contents of which is incorporated herein by a reference.

BACKGROUND OF THE INVENTION

1. Field of the Invention

The present invention relates to an antenna module, and, more particularly, to a concealable antenna module for a tablet personal computer.

2. Description of the Related Art

After the explosive growth and popularity of notebooks, tablet personal computers appeared in order to meet different users' needs and to add functions that notebooks lacked. Some tablet personal computers combining the properties of the notebook and the Personal Digital Assistant (PDA) can be switched between a notebook mode and a tablet mode. In the notebook mode, the tablet personal computer is used as a normal notebook. When the housing of the tablet personal computer is reversed such that the screen faces outside, and the housing folds to lap over the base, the computer is switched to the tablet mode. This enables a user conveniently to use the screen for hand-writing input.

With technological developments related to the internet, most notebooks have a hidden antenna device in the housing, with a screen to provide internet access, and maintain the appearance of a notebook. However, there are problems regarding the disposal of an antenna device for tablet personal computers. The housing of the aforementioned tablet personal computer is lapped over the base in the tablet mode. If it uses the same hidden antenna device as notebooks, interference from adjacent components or metal reflection may reduce the effectiveness of the signal transmission of the antenna device. Conversely, an antenna device disposed outside the housing can improve the effectiveness of signal transmission, but the whole appearance of the tablet personal computer may be harmed because of the protruding antenna device, thus discouraging consumers from buying them.

Therefore, it is desirable to provide a concealable antenna module for a tablet personal computer to mitigate and/or obviate the aforementioned problems.

SUMMARY OF THE INVENTION

A main objective of the present invention is to provide an antenna module capable of being concealed in a tablet personal computer.

In order to achieve the above-mentioned object, an antenna module of the present invention is applied to a tablet personal computer. The tablet personal computer comprises a main body and a housing with a screen. The housing is pivotally connected to the main body. The tablet personal computer is capable of being switched to a tablet mode. In the tablet mode, the screen faces an opposite side of a contact surface between the housing and the main body. The antenna module comprises an antenna device, a first magnetic member, and a second magnetic member. The antenna device is located concealably in the housing. The first magnetic member is coupled to an end of the antenna device. The second magnetic member is located in the main body. In the tablet mode, the second magnetic member is positioned corresponding to the first magnetic member such that an end of the antenna device can be moved outside the housing due to a magnetic force between the first magnetic member and the second magnetic member. Accordingly, the antenna module of the present invention can be concealed in the housing of the tablet personal computer in normal use. When the tablet personal computer is switched to the tablet mode, the antenna device can be ejected automatically from the housing due to the magnetic force, so as to enhance the effectiveness of signal transmission of the antenna.

A tablet personal computer of the present invention comprises a main body, a housing, and the aforementioned antenna module. The housing is pivotally connected to the main body. The housing comprises a screen. When the housing is adjusted to lap over the main body, and the screen faces an opposite side of a contact surface between the housing and the main body, the tablet personal computer is capable of being switched to a tablet mode. With the disposal of the aforementioned antenna module, the tablet personal computer of the present invention can automatically eject the antenna device in the tablet mode so as to improve the effectiveness of signal transmission of prior art hidden antennas, and the appearance of the tablet personal computer can be maintained.

BRIEF DESCRIPTION OF THE DRAWINGS

FIG. 1(*b*) is a cross-section of an antenna device of the antenna module of the present invention located in the tablet personal computer.

FIG. 2(*b*) is a partial schematic drawing of the antenna module of the present invention when the tablet personal computer is switched to the tablet mode.

DETAILED DESCRIPTION OF THE PREFERRED EMBODIMENT

The advantages and innovative features of the invention will become more apparent from the following detailed description when taken in conjunction with the accompanying drawings.

Figure 1A:
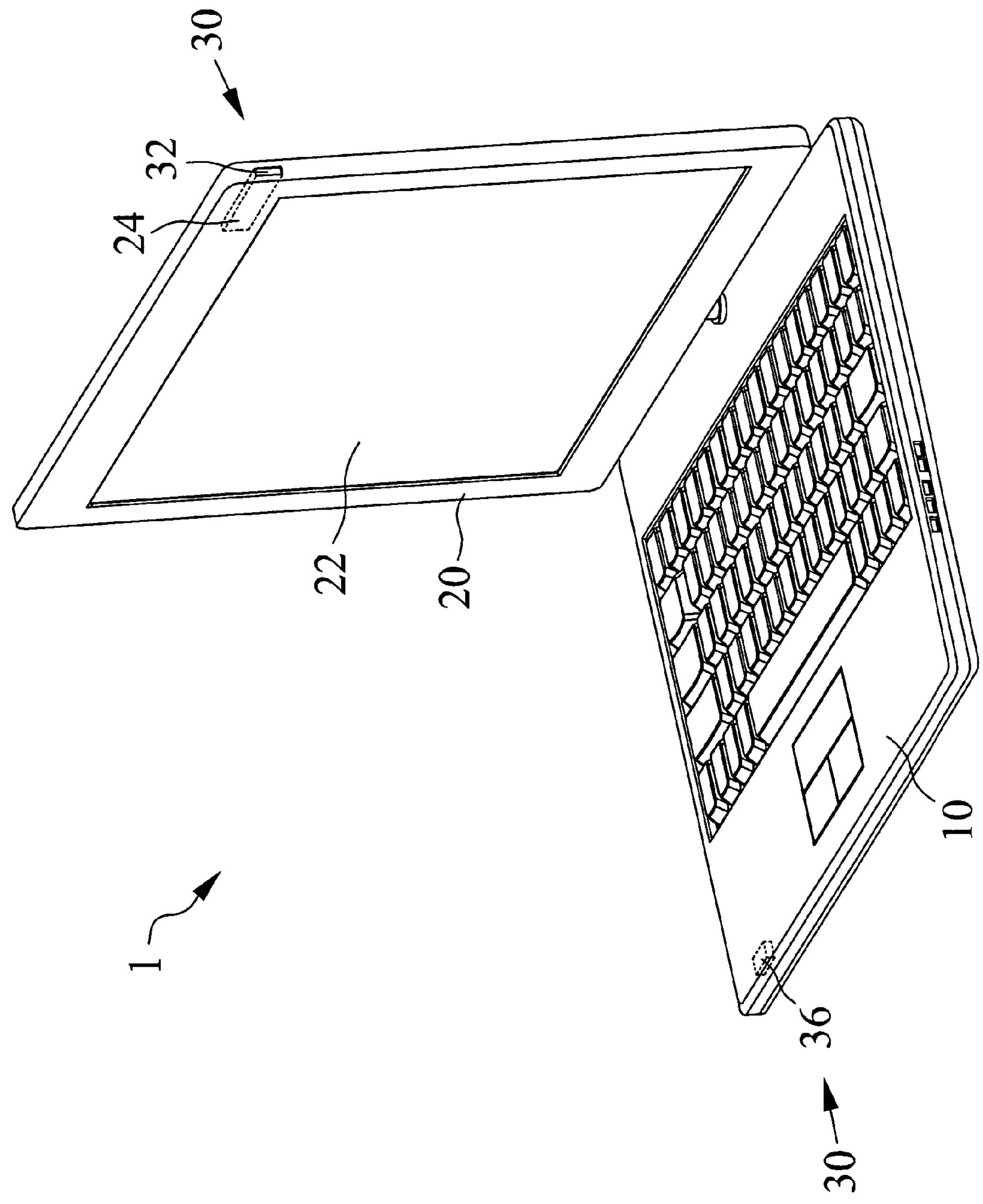
FIG. 1(*a*) is a schematic drawing of an antenna module of the present invention located in a tablet personal computer.
Figure 1B:
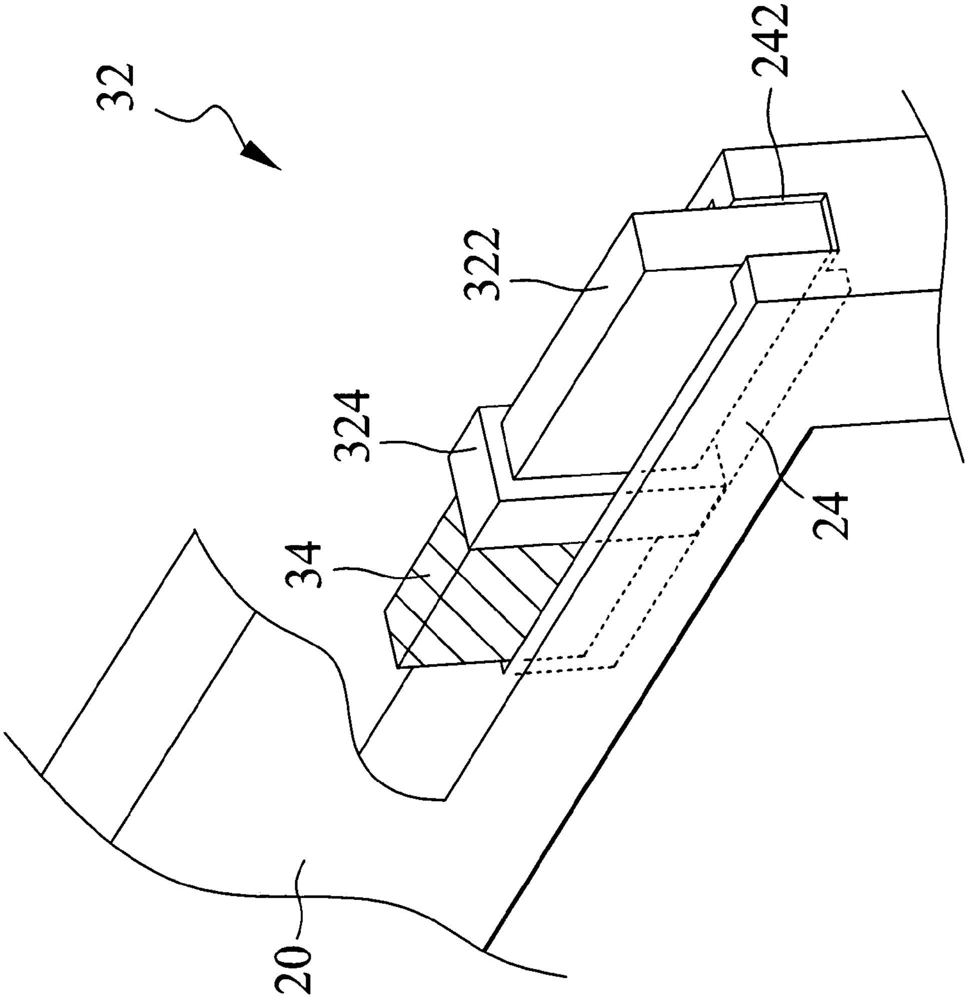

First, please refer to FIGS. 1(*a*) and (*b*). FIG. 1(*a*) is a schematic drawing of an antenna module 30 of the present invention located in a tablet personal computer 1. FIG. 1(*b*) is a cross-section of an antenna device 32 of the antenna module 30 of the present invention located in the tablet personal computer 1. As shown in FIG. 1(*a*), an antenna module 30 of the present invention is applied to a tablet personal computer 1. The tablet personal computer 1 comprises a main body 10 and a housing 20 with a screen 22. The housing 20 is pivotally connected to the main body 10 such that the housing 20 can rotate relatively to the main body 10, and such that the setting position of the housing 20 can be adjusted. The tablet personal computer 1 can be used as a normal notebook. When the setting position of the housing 20 is adjusted to lap over the main body 10 and the screen 22 faces an opposite side of a contact surface between the housing 20 and the main body 10, the tablet personal computer 1 is capable of being switched to a tablet mode.

As shown in FIGS. 1(*a*) and (*b*), the antenna module 30 comprises an antenna device 32. The antenna device 32 is located in a recess 24 of the housing 20 such that the antenna device 32 can be concealed in the housing 20. The antenna device 32 comprises an radiating member 322, and the recess 24 comprises an opening 242. The cross-sectional area of the radiating member 322 is equal to or smaller than the opening 242 such that the radiating member 322 can pass through the opening 242 and extend outward. The antenna device 32 further comprises a limiting structure 324. The cross-sectional area of the limiting structure 324 is larger than the opening 242 of the recess 24 so as to prevent the antenna device 32 from disengaging from the recess 24. The antenna module 30 further comprises a first magnetic member 34 coupled to an end of the antenna device 32. The antenna module 30 further comprises a second magnetic member 36 located in the main body 10.

Figure 2A:
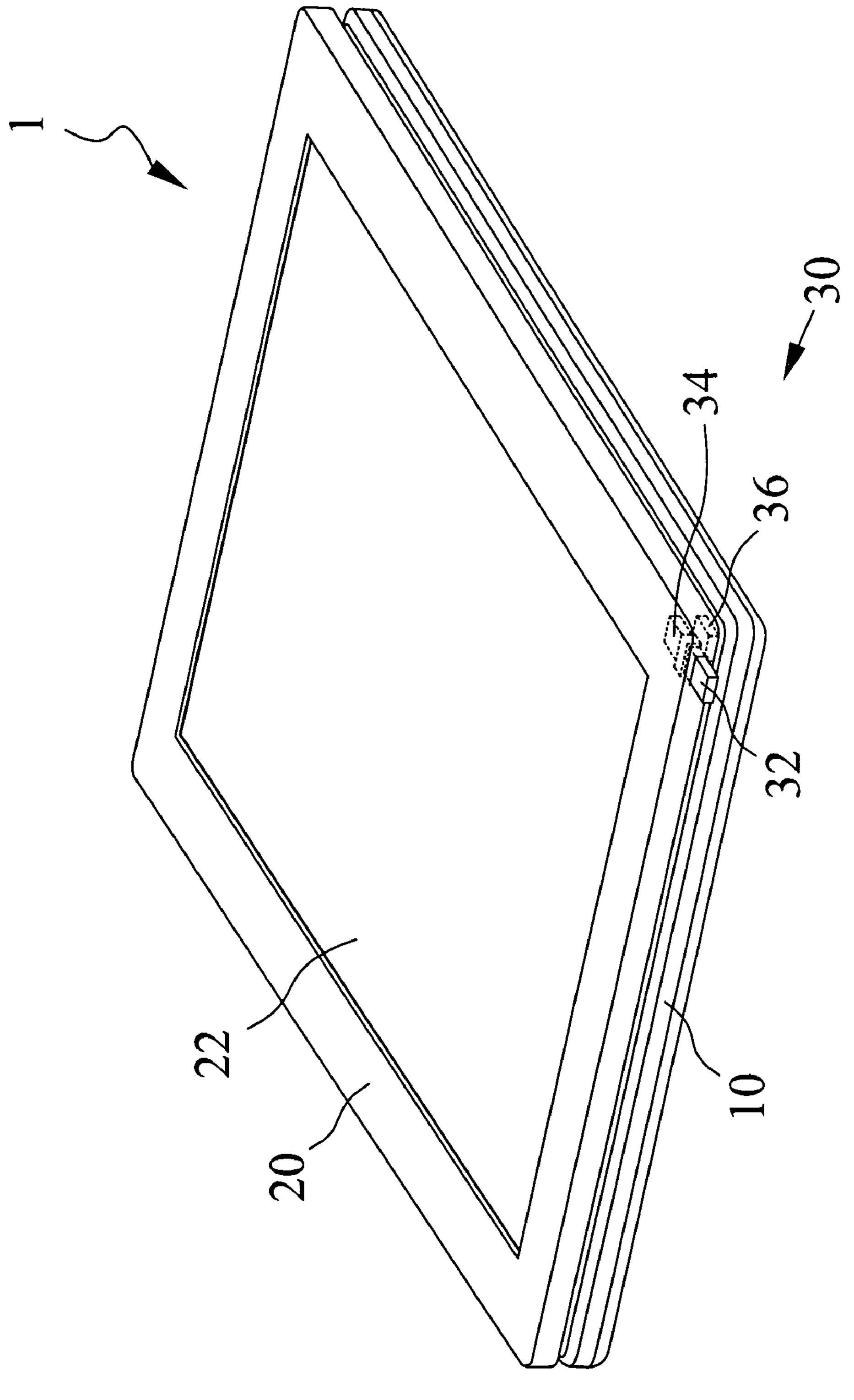
FIG. 2(*a*) is a schematic drawing of the antenna module of the present invention when the tablet personal computer is switched to a tablet mode.
Figure 2B:
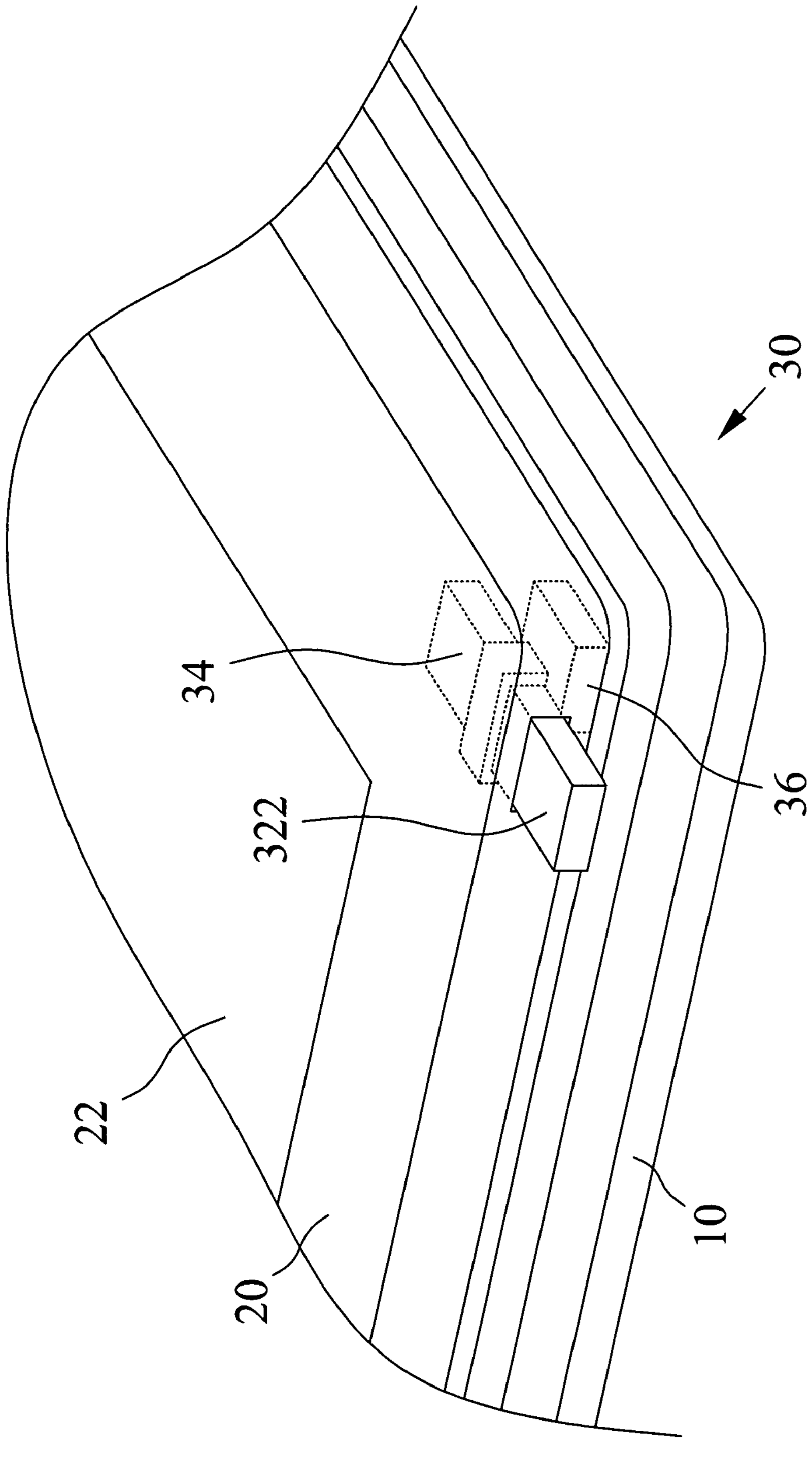

Please refer to FIGS. 2(*a*) and (*b*). FIG. 2(*a*) is a schematic drawing of the antenna module 30 of the present invention when the tablet personal computer 1 is switched to a tablet mode. FIG. 2 (*b*) is a partial schematic drawing of the antenna module 30 of the present invention when the tablet personal computer 1 is switched to the tablet mode. As shown in FIG. 2(*a*), the housing 20 of the tablet personal computer 1 can be rotated, and its setting position can be adjusted to lap over the main body 10 such that the screen 22 faces the opposite side of the contact surface between the housing 20 and the main body 10. The tablet personal computer 1 is thus switched to a tablet mode, and the first magnetic member 34 is positioned corresponding to the second magnetic member 36.

As shown in FIGS. 2(*a*) and (*b*), with the disposition of components of the antenna module 30 of the present invention, when the tablet personal computer 1 is in the tablet mode, the second magnetic member 36 is positioned just corresponding to the first magnetic member 34 so that there is a magnetic force generated between the first magnetic member 34 and the second magnetic member 36. The antenna device 32 is moved due to the above-mentioned magnetic force such that the radiating member 322 of the antenna device 32 moves outside the housing 20. With the design of the antenna module 30 of the present invention, when the housing 20 moves to a position such that the tablet personal computer 1 is switched to the tablet mode, the radiating member 322 of the antenna device 32 is ejected automatically from the recess (not shown) of the housing 20, so as to improve the effectiveness of signal transmission in the tablet mode. As shown in FIG. 1, in this embodiment, the antenna device 32 of the antenna module 30 of the present invention is located on the lateral side of the housing 20. When the tablet personal computer is switched back to the normal notebook mode, the first magnetic member 34 is not close to the second magnetic member 36, so the magnetic force disappears. Thus, the user can directly and manually push the radiating member 322 of the antenna device 32 into the recess so that the whole antenna device 32 is concealed in the housing 20. The appearance of the tablet personal computer 1 can be maintained.

Figure 3:
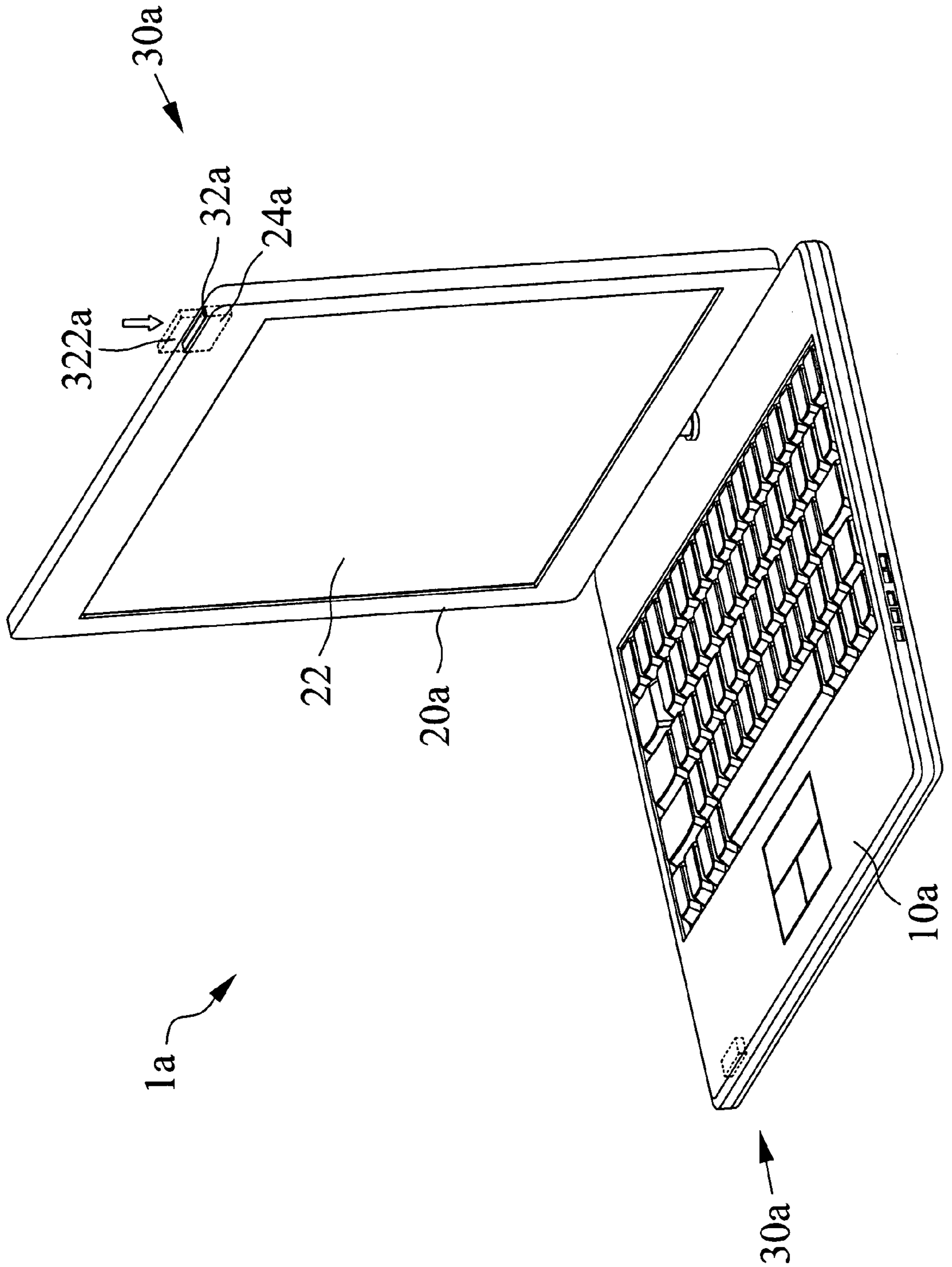
FIG. 3 is a schematic drawing of an antenna module applied to a tablet personal computer in accordance with another embodiment of the present invention.

Please refer to FIG. 3, a schematic drawing of an antenna module 30*a* applied to a tablet personal computer 1*a* in accordance with another embodiment of the present invention. This embodiment is slightly different from the aforementioned embodiment. As shown in FIG. 3, in this embodiment, an antenna device 32*a* of an antenna module 30*a* of the present invention is located on the top of the housing 20. When the tablet personal computer 1*a* is in the tablet mode, an radiating member 322*a* of the antenna device 32*a* is also ejected from the recess 24*a* of the housing 20 due to the magnetic force. When the tablet personal computer 1*a* is switched to the normal notebook mode, the magnetic force exerted on the antenna device 32*a* disappears. The antenna device 32*a* is moved back into the recess 24*a* by gravity directly, and the position in which the antenna device 32*a* can move back is limited by the design of the recess 24*a*. Therefore, the user does not need to manually push the antenna device 32*a* back into place.

Figure 4A:
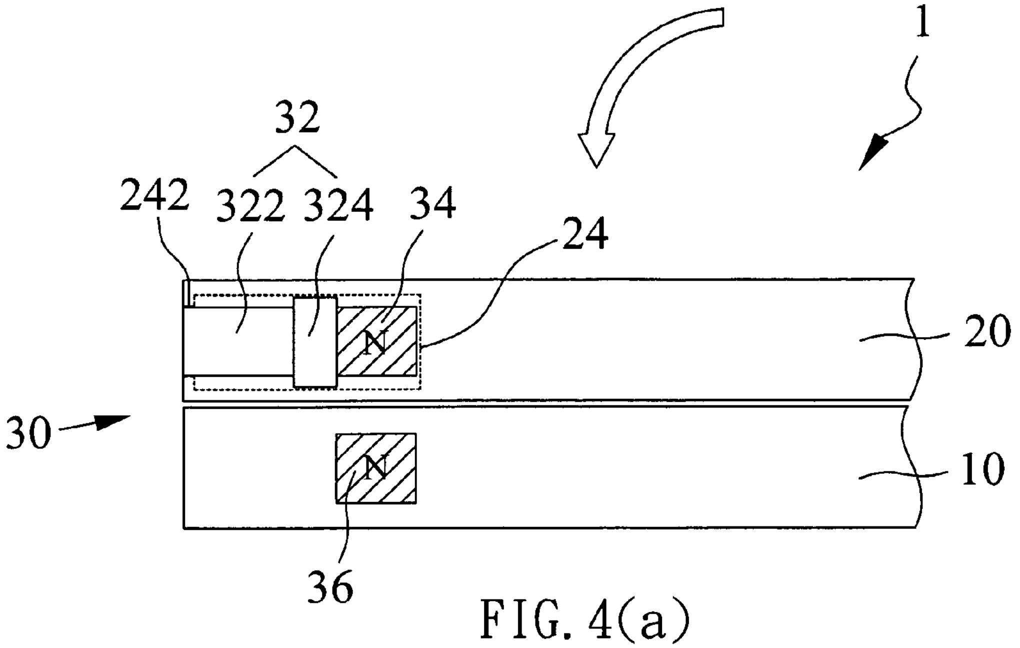
FIGS. 4(*a*) and (*b*) are schematic drawings of the operation of the antenna module of the present invention when the poles of the first magnetic member and the second magnetic member are the same.
Figure 4B:
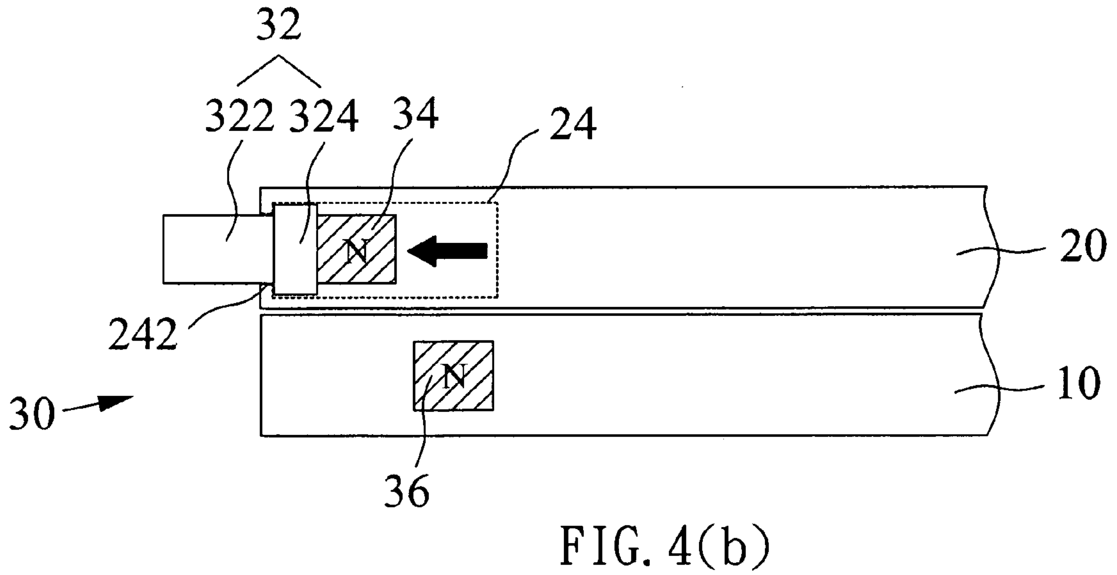

Please refer to FIGS. 4(*a*) and (*b*). FIGS. 4(*a*) and (*b*) are schematic drawings of the operation of the antenna module 30 of the present invention when the poles of the first magnetic member 34 and the second magnetic member 36 are the same. As shown in FIG. 4(*a*), in this embodiment, the first magnetic member 34 and the second magnetic member 36 are like poles (e.g. both are N-poles). With the design of the present invention, when the housing 20 is moved such that the tablet personal computer 1 is switched to the tablet mode, the first magnetic member 34 is aligned with the second magnetic member 36. Since like poles repel, there is a repulsive force between the first magnetic member 34 and the second magnetic member 36. Because the first magnetic member 34 is movably located in the recess 24, the repulsive force exerted on the first magnetic member 34 pushes the antenna device 32 and causes it to move. As shown in FIG. 4(*b*), the radiating member 322 of the antenna device 32 can pass through the opening 242 of the recess 24 and move outside the housing 20, so as to produce the desired effect of signal transmission. In addition, the limiting structure 324 of the antenna device 32 blocks the housing 20 so as to prevent the antenna device 32 from disengaging from the recess 24.

Figure 5A:
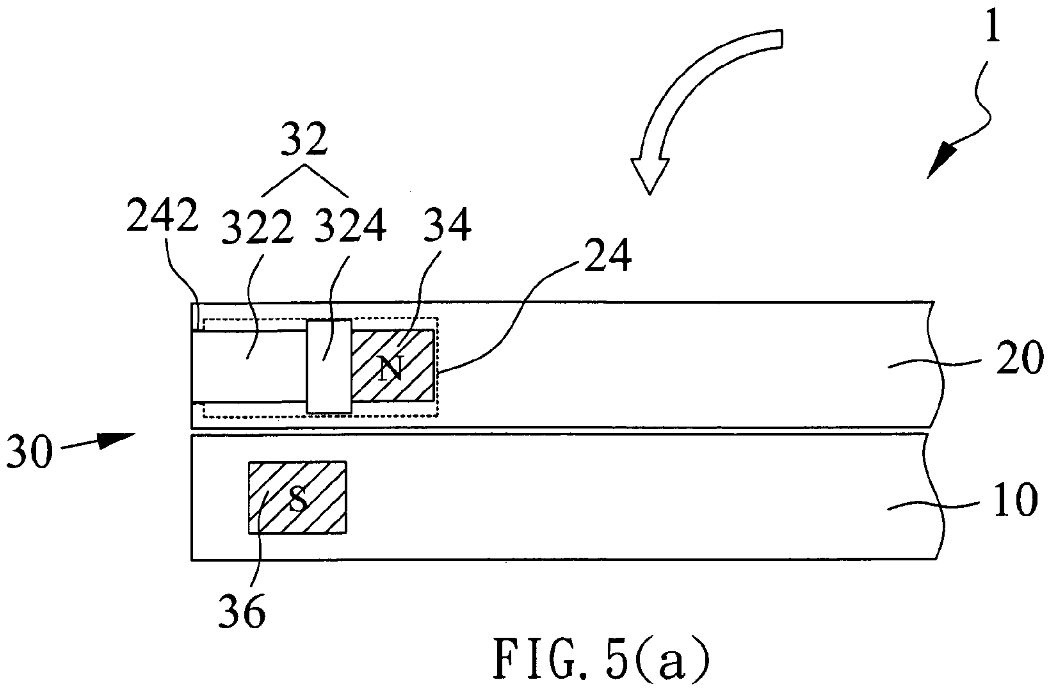
FIGS. 5(*a*) and (*b*) are schematic drawings of the operation of the antenna module of the present invention when the poles of the first magnetic member and the second magnetic member are opposite.
Figure 5B:
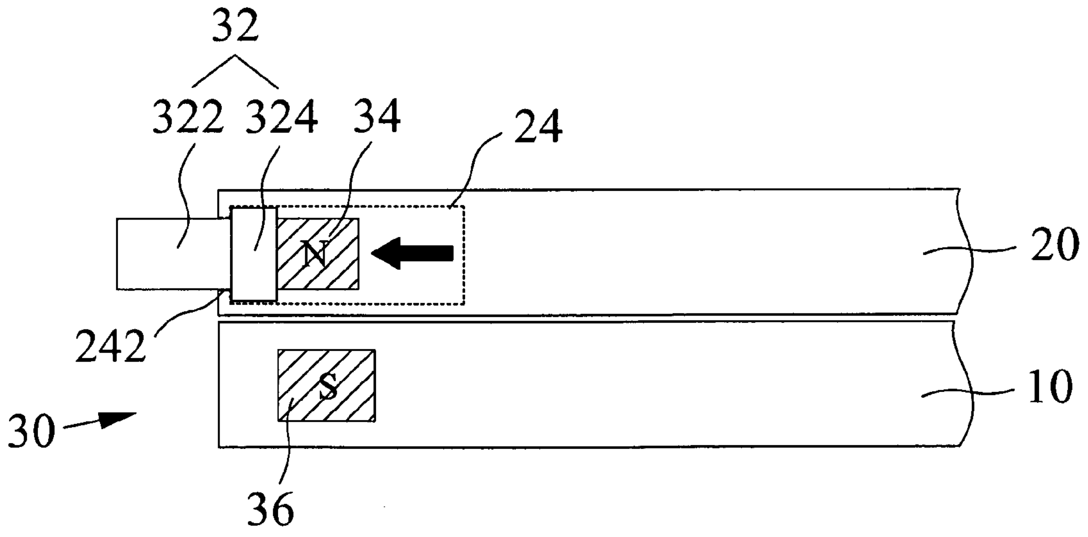

Please refer to FIGS. 5(*a*) and (*b*). FIGS. 5(*a*) and (*b*) are schematic drawings of the operation of the antenna module 30 of the present invention when poles of the first magnetic member 34 and the second magnetic member 36 are opposite. As shown in FIG. 5(*a*), in this embodiment, the first magnetic member 34 and the second magnetic member 36 are opposite poles (e.g. N-pole and S-pole). With the design of the present invention, when the housing 20 is moved such that the tablet personal computer 1 is switched to the tablet mode, the position of the first magnetic member 34 is farther away from the surface of the housing 20 than the second magnetic member 36. Since opposite poles attract, there is an attractive force between the first magnetic member 34 and the second magnetic member 36. Thus, the attractive force exerted on the first magnetic member 34 pushes the antenna device 32 and causes it to move. As shown in FIG. 5(*b*), when the first magnetic member 34 moves to the position in which it is aligned with the second magnetic member 36, the first magnetic member 34 stops due to the attractive force between the two magnetic members. The antenna device 32 allows the radiating member 322 to pass through the opening 242 of the recess 24 and to move outside the housing 20. Similarly, the above-mentioned desired effect of signal transmission can be produced.

As shown in FIG. 1(*a*) or FIG. 3, the tablet personal computer 1, 1*a* of the present invention comprises the main body 10, 10*a*, the housing 20, 20*a* and the aforementioned antenna module 30, 30*a*. The housing 20, 20*a* is pivotally connected to the main body 10, 10*a*. The housing 20, 20*a* comprises the screen 22. When the housing 20, 20*a* is adjusted to lap over the main body 10, 10*a*, and the screen 22 faces the opposite side of the contact surface between the housing 20, 20a and the main body 10, 10a, the tablet personal computer 1, 1a is capable of being switched to the tablet mode. With the aforementioned disposition of components of the antenna module 30, 30a, the antenna device 32, 32a of the tablet personal computer 1, 1a of the present invention can automatically eject in the tablet mode, so as to produce the desired effect of signal transmission. When the tablet personal computer 1, 1a of the present invention is switched to the normal notebook mode, the antenna device 32, 32a can also move back into the recess 24, 24a manually or automatically with the aforementioned design of the antenna module 30, 30a. Therefore, the antenna device 32, 32a will not affect the consistency of appearance of the tablet personal computer 1, 1a of the present invention.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An antenna module applied to a tablet personal computer, the tablet personal computer comprising a main body and a housing with a screen, the housing being pivotally connected to the main body, the tablet personal computer being capable of being switched to a tablet mode; in the tablet mode, the screen faces an opposite side of a contact surface between the housing and the main body, the antenna module comprising:
- an antenna device located concealably in the housing;
- a first magnetic member coupled to an end of the antenna device; and
- a second magnetic member located in the main body; in the tablet mode, the second magnetic member is positioned corresponding to the first magnetic member so that an end of the antenna device can be moved outside the housing due to a magnetic force between the first magnetic member and the second magnetic member.

2. The antenna module as claimed in claim 1, wherein the antenna device is located in a recess of the housing.

3. The antenna module as claimed in claim 2, wherein the antenna device further comprises an radiating member, and the cross-sectional area of the radiating member is equal to or smaller than an opening of the recess such that the radiating member can pass through the opening.

4. The antenna module as claimed in claim 3, wherein the antenna device further comprises a limiting structure, and the cross-sectional area of the limiting structure is larger than the opening of the recess, so as to prevent the antenna device from disengaging from the recess.

5. The antenna module as claimed in claim 1, wherein poles of the first magnetic member and the second magnetic member are the same.

6. The antenna module as claimed in claim 1, wherein poles of the first magnetic member and the second magnetic member are opposite.

7. The antenna module as claimed in claim 2, wherein the recess is a hole formed on a side of the housing.

8. The antenna module as claimed in claim 7, wherein the side of the housing is on a lateral side of the housing.

9. The antenna module as claimed in claim 7, wherein the side of the housing is on a top side of the housing.

10. A tablet personal computer comprising:
- a main body;
- a housing pivotally connected to the main body comprising a screen; when the housing is adjusted to lap over the main body and the screen faces an opposite side of a contact surface between the housing and the main body, the tablet personal computer is capable of being switched to a tablet mode; and
- an antenna module comprising:
- an antenna device located concealably in the housing;
- a first magnetic member coupled to an end of the antenna device; and
- a second magnetic member located in the main body; in the tablet mode, the second magnet member is positioned corresponding to the first magnetic member so that an end of the antenna device can be moved outside the housing due to a magnetic force between the first magnetic member and the second magnetic member.

11. The tablet personal computer as claimed in claim 10, wherein the antenna device is located in a recess of the housing.

12. The tablet personal computer as claimed in claim 11, wherein the antenna device further comprises an radiating member, and the cross-sectional area of the radiating member is equal to or smaller than an opening of the recess such that the radiating member can pass through the opening.

13. The tablet personal computer as claimed in claim 12, wherein the antenna device further comprises a limiting structure, and the cross-sectional area of the limiting structure is larger than the opening of the recess so as to prevent the antenna device from disengaging from the recess.

14. The tablet personal computer as claimed in claim 11, wherein the recess is a hole formed on a side of the housing.

15. The tablet personal computer as claimed in claim 14, wherein the side of the housing is on a lateral side of the housing.

16. The tablet personal computer as claimed in claim 14, wherein the side of the housing is on a top side of the housing.

17. The tablet personal computer as claimed in claim 10, wherein poles of the first magnetic member and the second magnetic member are the same.

18. The tablet personal computer as claimed in claim 10, wherein poles of the first magnetic member and the second magnetic member are opposite.

19. An antenna module applied to a tablet personal computer, the tablet personal computer comprising a main body and a housing with a screen, the housing being pivotally connected to the main body, the tablet personal computer being capable of being switched to a tablet mode; in the tablet mode, the screen faces an opposite side of a contact surface between the housing and the main body, the antenna module comprising:
- an antenna device located concealably in a recess of the housing comprising a limiting structure, wherein the cross-sectional area of the limiting structure is larger than an opening of the recess, so as to prevent the antenna device from disengaging from the recess;
- a first magnetic member coupled to an end of the antenna device; and
- a second magnetic member located in the main body; in the tablet mode, the second magnetic member is positioned corresponding to the first magnetic member so that an end of the antenna device can be moved outside the housing due to a magnetic force between the first magnetic member and the second magnetic member.

* * * * *